United States Patent [19]

Hagen et al.

[11] 4,307,265

[45] Dec. 22, 1981

[54] CIRCUIT ARRANGEMENT FOR TRANSMITTING DIGITAL SIGNALS BETWEEN TRANSMITTING AND/OR RECEIVING DEVICES OPERATING WITH DIFFERENT DATA TRANSMISSION PROCEDURES AND DIFFERENT DATA FORMATS

[75] Inventors: Rolf Hagen, Unterhaching; Ola Bergman; Juergen Harenberg, both of Munich; Herbert Steiner, Gelting, all of Fed. Rep. of Germany

[73] Assignee: Siemens Aktiengesellschaft, Berlin & Munich, Fed. Rep. of Germany

[21] Appl. No.: 185,559

[22] Filed: Sep. 9, 1980

[30] Foreign Application Priority Data

Sep. 25, 1979 [DE] Fed. Rep. of Germany ....... 2938750

[51] Int. Cl.³ .................... H04L 11/00; H04L 11/20
[52] U.S. Cl. ...................................... 178/3; 178/17.5; 178/26 R
[58] Field of Search ............... 178/2 R, 3, 17.5, 26 R, 178/26 A, 30; 370/41, 91; 364/900; 179/18 ES

[56] References Cited

U.S. PATENT DOCUMENTS

| | | | |
|---|---|---|---|
| 3,958,088 | 5/1976 | Vieri ........................ | 178/3 |
| 4,144,407 | 3/1979 | Zaffignani et al. ............ | 179/18 ES |
| 4,156,796 | 5/1979 | O'Neal et al. .............. | 178/3 |
| 4,241,802 | 12/1980 | Bergman ................... | 178/3 |

OTHER PUBLICATIONS

Siemens System EDS System Description, Oct. 1977.

Primary Examiner—Thomas A. Robinson
Attorney, Agent, or Firm—Hill, Van Santen, Steadman, Chiara & Simpson

[57] ABSTRACT

A circuit arrangement is provided for the transmission of digital signals between transmitting and/or receiving stations which operate with differing data transmission procedures and with different data formats. The signal transmission respectively occurs by way of a converter unit which, like the transmitting and receiving installations, is connected to a switching system. In the train of the transmission of digital signals from a transmitting installation operating with a lower data transmission rate to a receiving installation operating with a higher data transmission rate, the digital signals emitted by the appertaining transmitting installation are first collected in the converter unit in order to be emitted to the appertaining receiving installation only given the existence of a sufficient plurality of such signals. The transmission of digital signals from a transmitting installation operating with a higher data transmission rate to a receiving installation operating with a lower transmission rate occurs in data blocks. A respective plurality of data signals forming a block or, respectively, a signal group, is emitted together with a signal group end mark by the appertaining transmitting installation to the converter unit which then relays the digital signals to the appertaining receiving installation. In order to minimize control expense, the converter unit checks its signal acceptance capability upon the occurrence of the group end mark. Only given existence of a sufficient signal acceptance capability in the converter unit is an acknowledgment character emitted to the transmitting installation, the acknowledgment character then causing the transmission of signals forming a further signal group or block. The invention is preferably employed for signal transmission between telex stations and office printergram or teletex stations.

6 Claims, 1 Drawing Figure

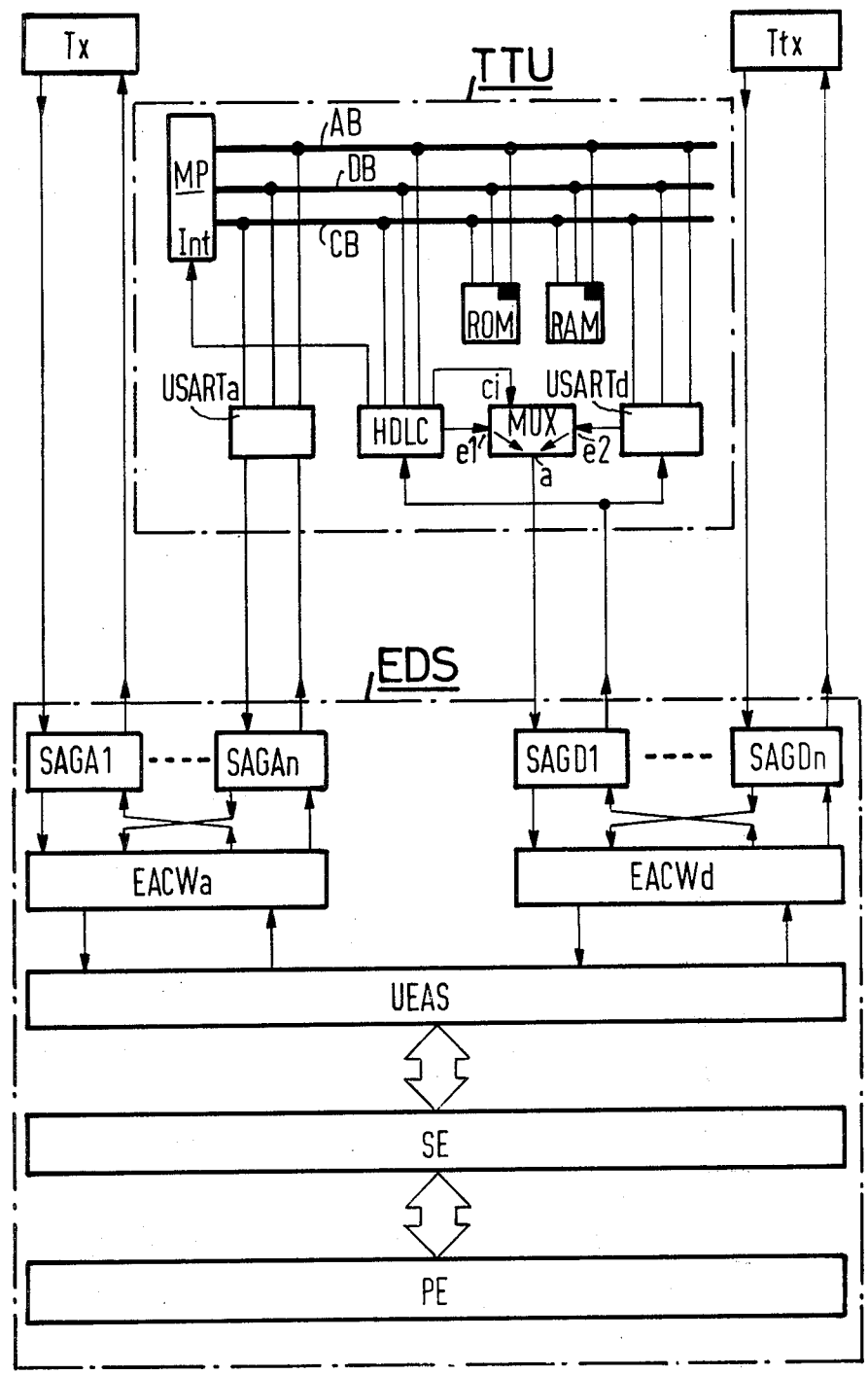

CIRCUIT ARRANGEMENT FOR TRANSMITTING DIGITAL SIGNALS BETWEEN TRANSMITTING AND/OR RECEIVING DEVICES OPERATING WITH DIFFERENT DATA TRANSMISSION PROCEDURES AND DIFFERENT DATA FORMATS

BACKGROUND OF THE INVENTION

1. Field of the Invention

This invention relates to digital transmission arrangements and is more particularly concerned with digital transmission arrangements for transmitting digital signals between devices which operate with different data transmission procedures and with different data formats.

2. Description of the Prior Art

It is already known, in conjunction with a transmission of digital signals having differing data transmission procedures and differing data formats between transmitting and receiving installations, to adjust the individual receiving installations in accordance with respective data transmission procedure and the respective data format. In these receiving installations, it is a matter of teleprinter machines which are to be designed both for receiving teleprinter signals (telex operation) as well as for receiving office printergrams (teletex operation). The appertaining machines, moreover, are designed in accordance with the transmission of signals with two different transmission procedures and data formats. Whereas one works in telex operation with the data transmission rate of 50 bit/sec. and with a start-stop control, teletex operation is a matter of a synchronous data transmission operation with a data transmission rate of, for example, 2400 bit/sec. The transfer apparatus, therefore, required in the individual office machines, however, require a significant circuit expense.

The German patent application P 29 12 649.6 reveals a way to make do with lower circuit expense in comparison thereto in order to be able to transmit digital signals with mutually different data transmission procedures and in mutually different data formats between transmitting devices and receiving devices.

This German application relates to a circuit arrangement for the transmission of digital signals between transmitting and/or receiving installations operating in accordance with a first data transmission procedure and with a first data format and transmission and/or receiving installations operating in accordance with a second data transmission procedure different from the first data transmission procedure, as well as with a second data format differing from the first data format, via a switching system. What is meant by the term "data transmission procedure" is both the data transmission rate and the type of transmission of signals.

What is viewed as being essential in the circuit arrangement indicated above is that the transmission and/or receiving installation designed for operation with the first data transmission procedure and the first data format and the transmission and/or receiving installations designed for operation with the second data transmission procedure and the second data format are connected to separate termination circuits provided for the respective data transmission procedure and the respective data format in a first group or, respectively, in a second group of termination circuits of the switching system and that a conversion unit is connected to at least one termination circuit of each group of termination circuits into which conversion unit all signals emitted by a transmission installation belonging to one message in accordance with the first data transmission procedure and with the first data format or, respectively, in accordance with the second data transmission procedure and with a second data format can be respectively enscribed, and from which conversion unit, subsequently, all signals belonging to the respective message can be output and emitted in accordance with a second or, respectively, with the first data transmission procedure and with the second or, respectively, first data format to the receiving installation which is receiving signals.

A relatively high memory expense occurs, however, in the converter unit due to these features.

SUMMARY OF THE INVENTION

The object of the invention is to provide a way to proceed, given a circuit arrangement with the fundamental features set forth above, in order to make do with less circuit expense than in the circuit arrangement considered above and, namely, with a low control expense.

In order to achieve the object set forth above, the present invention therefore proceeds from a circuit arrangement for the transmission of data signals between transmitting and/or receiving installations operating with a first data transmission procedure and a first data format and transmitting and/or receiving installations operating with a second data transmission procedure differing from the first data transmission procedure, as well as with a second data format differing from the first data format, via a switching system. The signal transmission, in accordance with the first data transmission procedure, occurs with a data transmission rate which is higher than the data transmission rate with which the signal transmission occurs in accordance with the second data transmission procedure, whereby the transmitting and/or receiving installations designed for operation with the first data transmission procedure and the first data format and the transmitting and/or receiving installations designed for operation with the second data transmission procedure and the second data format are connected to separate termination circuits provided for the respective data transmission procedure and the respective data format in a first group or, respectively, in a second group of termination circuits of the switching systems. A converter unit is connected to at least one termination circuit of each group of termination circuits, into which the message signals to be emitted overall only in the train of a signal transmission from a transmission installation operating with the first data transmission procedure and in the first data format to a receiving installation operating with the second data transmission procedure and the second data format can be enscribed in accordance with the first data transmission procedure and with the first data format in the form of signal groups respectively comprising a plurality of signals. From the converter unit, subsequently, the signals belonging to the respective signal group can be output and emitted in accordance with the second data transmission procedure and with the second data format to a receiving installation for signal reception. In the course of a signal transmission from a transmission installation operating in accordance with the second data transmission procedure and with the second data format to a receiving installation operating in accordance with the first data transmission procedure and the first data format, the message signals to be respectively transmitted can be input into the converter unit in accordance with the second data transmission procedure and second data format and, after existence of a sufficient plurality of signals, can be output in accordance with the first data transmission procedure and with the first data format and transmitted to an appertaining receiving installation.

What is viewed as characteristic for the circuit arrangement described above, in accordance with the present invention, is that a signal group end mark is transmitted following each signal transmission by the transmitting installation operating in accordance with the first data format and the first data transmission procedure to the converter unit, the signal group end mark serving to check the signal acceptance capability in the converter unit and, upon existence of a sufficient signal acceptance capability in the converter unit causing the transmission of an acknowledgement character to the transmitting installation, the transmitting installation not transmitting signals forming a further signal group until after receiving such acknowledgement character.

The invention provides the advantage that one can make due with less control expense in the transmission of the signal group end marks and acknowledgement characters than in the circuit arrangement initially considered. According to the present invention, the appertaining characters, namely, are only transmitted between the transmitting installations operating with the first data transmission procedure and the first data format and the converter unit, but are not also transmitted between the converter unit and the receiving installation operating with the second data transmission procedure and the second data format. The connection segment between these receiving installations and the converter unit, therefore, is available for a signal transmission.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE which is a schematic block diagram of a circuit arrangement constructed and operating in accordance with the present invention.

DESCRIPTION OF THE PREFERRED EMBODIMENTS

On the drawing, as in the initially cited patent application, a known electronic data switching system EDS is partially illustrated (cf. "Nachrichtentechnische Zeitschrift", Vol. 22, 1969, pp. 444-463 and the Siemens publication "Siemens System EDS", System Description, Siemens Corporation, Iselin, New Jersey), which is fully incorporated herein by this reference. In the present case, the only portions of this data switching system EDS illustrated are termination circuits SAGA1—SAGAn belonging to a first group of termination circuits, termination circuits SAGD1—SAGDn belonging to a second group of termination circuits, input/output code converters EACWa or, respectively, EACWd assigned to the individual groups of termination circuits, a transmission sequence control UEAS, a memory unit SE and a program control unit PE. The termination circuits SAGA1—SAGAn serve to process digital signals which have polarity reversals. The termination circuits SAGD1—SAGDn belonging to the other group of termination circuits serve for the processing of so-called bit groups, i.e. digital signals respectively comprising a plurality of bits, which are also designated as envelopes. One envelope normally comprises, for example, 8 bits.

Of the termination circuits indicated on the drawing, the termination circuits processing polarity reversals are connected to transmitting/receiving installations which transmit and receive digital signals at a first data transmission rate and in a first data format. These transmitting/receiving installations may be matter of standard teleprinter or, respectively, telex stations, of which one such station is indicated on the drawing and referenced Tx. These telex stations operate, for example, with the data transmission rate of 50 Bd and employ the International Telegraph Alphabet No. 2, i.e. with a start-stop data format. The termination circuits processing digital signals in the form of bit groups or, respectively, envelopes of the second group of termination circuits SAGD1—SAGDn illustrated on the drawing are connected to transmitting/receiving installations which can transmit or, respectively, receive digital signals serially in the form of bit groups. Let these transmitting/receiving installations be a matter of office printergram machines, which are also called teletex stations, in the present case, of which one is indicated on the drawing and referenced Ttx. These office printergram stations are capable of transmitting and receiving digital signals at a data transmission rate of 2400 bit/sec, namely as synchronous data signals. This means that bits belonging respectively to one bit group are not identified by start and stop characters. One data signal (word) normally comprises, for example, 8 bits.

According to the invention, a converter unit TTU is connected to the data switching system illustrated on the drawing. The converter unit TTU which, if necessary, can be provided in a plurality, has, as it were, two different terminal sides. At one terminal side, the converter TTU is connected to one of the termination circuits SAGA1—SAGAn belonging to the first group of termination circuits, here the termination circuit SAGAn. At the other terminal side, the converter unit TTU is connected to one of the termination circuits SAGD1—SAGDn belonging to the second group of termination circuits, here the termination circuit SAGD1. Thereby, the converter unit TTU is connected on its one terminal side on the input and output side of the termination circuit SAGAn of the first group of termination circuits by means of an interface circuit USARTa. On its other terminal side, the converter unit TTU is connected to the termination circuit SAGD1 of the second group of termination circuits with a further interface circuit which contains a signaling conversion circuit USARTd and a data switching circuit HDLC. These two circuits are connected with common inputs to the output of the termination circuit SAGD1. The termination circuit SAGD1 is connected with its input to the output a of a switch circuit MUX which is connected with its signal inputs e1, e2 to outputs of the circuits USARTd and HDLC of the interface circuit just considered. With a control input ci, the switch circuit MUX is connected to a control output of the data switching circuit HDLC. Depending on which control signal is supplied to the control input ci of the switch circuit MUX, the circuit MUX connects its output a either to its signal input e2 or to its signal input e1.

Thereby, one can proceed in such a manner that the switch circuit MUX, given lack of a corresponding control signal, connects its output a to its signal input e2 or, respectively, through connects these terminals. It should also be pointed out at this time that the outputs of the data switching circuit HDLC or, respectively, of the signaling converter circuit USARTd connected to the two signal inputs e1, e2 do not emit signals to these outputs which had been supplied to these inputs. On the contrary, the appertaining circuits emit signals at the outputs just mentioned when appropriate signals are supplied to further inputs or, respectively, terminals yet to be considered. As to the control of the switch circuit MUX, it should also be pointed out that a control signal required may be emitted in response to appropriate drive by the data switching circuit HDLC by the control circuit of the converter unit TTU yet to be considered in greater detail.

The two interface circuits, that is the interface circuit USARTa on the one hand and, on the other hand, the interface circuit with the data switching circuit HDLC and the signaling converter USARTd, considered above are connected with a plurality of terminals to the previously-mentioned control circuit of the converter unit TTU. In the present case, this control circuit contains a microprocessor MP having an appertaining program memory ROM. In this context, it is indicated on the drawing that a plurality of bus lines is provided at which the microprocessor MP and the program memory ROM are connected, letting the latter be a matter, preferably, of a read only memory. One bus line AB represents an address bus line; another bus line DB represents a data line; another bus line CB represents a control bus line. The interface circuits are connected with appropriate terminals to these three bus lines AB, DB and CB. Moreover, a memory RAM is connected with appropriate terminals to the three bus lines. This memory RAM is a matter of a memory having a random access capability. As shall become clearer below, the memory RAM serves for the intermediate storage of signals which are to be transmitted from a telex station to a teletex station or from a teletex station to a telex station. These signals comprise both signaling information and message information.

In addition to the circuit connections set forth above, a further circuit connection should also be noted. The data switching circuit HDLC of the converter unit TTU, in particular, is connected with a separate output to a so-called interrupt input Int of the microprocessor MP. By way of this switch connection, the microprocessor MP can be influenced in its operation via the data switching circuit HDLC to control the sequencing of operations which relate to the data transmission as shall become more clear from the description below. Moreover, separate interrupt signals which are derived, for example, from network clock pulse signals which are employed in the data network EDS can be supplied to the microprocessor MP at the same interrupt input or at corresponding further interrupt inputs. The microprocessor MP will then control the processing of signals which are supplied to the converter unit TTU by telex stations or by teletex stations at the frequency of the occurrence of such interrupt signals.

The format of the circuit arrangement illustrated on the drawing having been discussed above, let the manner of operation of this circuit arrangement now be considered in greater detail. Thereby, those operations shall be first fundamentally discussed which are determined for the transmission of digital signals between a telex station Tx and an office printergram or, respectively, teletex station Ttx. Further details concerning the general operations of the data switching system EDS need not be discussed in greater detail here, since these functions are to be presumed as being well known in the art.

For explaining the manner of operation of the circuit arrangement illustrated on the drawing, let it be assumed that the telex station Tx transmits a teleprinter message with 50 Bd. The digital signals forming this teleprinter message, i.e. both the signaling information and message information, arrive serially via the termination circuit SAGA1 into the data switching system EDS which, on the basis of its switching operation, emits these digital signals via the terminal circuit SAGAn to the interface circuit USARTa of the converter unit TTU. In the present case, let the interface circuit USARTa convert the digital signals supplied thereto serially into a parallel form and emit the same by way of the data bus DB to the memory RAM. Thereby, only as many digital signals are respectively input into the memory RAM so that these can in turn be emitted in accordance with the data transmission procedure of the teletex stations to such a teletex station. In the most simple case, thereby, it can be a matter of a single teleprinter character.

The interface circuit comprising, in the converter unit TTU, the data switching circuit HDLC and the signaling converter circuit USARTd is determinant for relaying the above-mentioned signals successively input into the memory RAM by a telex station. The parallel/series conversion of the bitsbelonging to a signaling information occurs in the signaling converter circuit USARTd and, moreover, such a format conversion occurs that, by means of the converted signaling information, the desired teletex station can also be selected. A parallel/series conversion of the message signals stored in the memory RAM, as well as the format conversion of the appertaining signals, occurs in the data switching circuit HDLC, so that these signals can be accepted by the desired teletex station. As already mentioned aboove, the digital signals formed in this manner are emitted via the correspondingly set switch circuit MUX to the termination circit SAGD1 of the data switching system EDS. The appertaining digital signals are then emitted via the termination circuit SAGDn by the data switching system EDS to the desired teletex station, such as to the teletex station Ttx illustrated on the drawing.

When digital signals are emitted by a teletex station, such as the teletex station Ttx indicated on the drawing, in order to be transmitted to a teletex station, such as the teletex station Tx illustrated on the drawing, then the following operations occur. The appertaining digital signals first arrive via the termination circuit SAGDn into the data switching system EDS, which emits these digital signals via the termination circuit SAGD1 to the converter unit TTU. Thereby, the data switching circuit HDLC now undertakes a series/parallel conversion of the serially-occurring digital signals, in particular, of the actual message signals. These signals are then emitted via the data bus DB to the memory RAM. The signaling converter circuit USARTd undertakes a corresponding series/parallel conversion of the signaling information and, moreover, this circuit effects a format conversion of the signaling information, so that the same can be directly employed for a selection of a desired teletex station. The transmission of the digital signals to be emitted from the teletex station Ttx, however, here occurs in data blocks. This means that only respective groups or, respectively, signal blocks comprising a plurality of digital signals are emitted from a teletex station to the converter unit TTU. Such a signal group can exhibit, for example, such a size that a signaling information is completely covered. After acceptance of such a signal group in the converter unit TTU (this acceptance has been undertaken with the data transmission procedure determinant for teletex stations and with the data format thereby determinant) the signals belonging to the appertaining signal group are output from the memory RAM and emitted by the converter unit TTU to the data switching system EDS. If the signals of such a group comprise a signaling information, then the completion of a connection to a desired telex station, such as the telex station Tx, occurs in the data switching system EDS. If, on the other hand, the appertaining signals are message signals, then the same are fed by way of the already existing connection to the appertaining telex station Tx, in particular, with the data transmission procedure and with the data format of such a telex station. Thereby, a parallel/series conversion of the digital signals output from the memory RAM and emitted to the interface circuit USARTa of the conversion unit TTU occurs in the interface circuit.

A signal group end mark is transmitted following each signal transmission from the teletex station to the converter unit TTU. This signal group end mark is employed by the microprocessor of the converting unit TTU in order to check the signal acceptance capability of the converter unit TTU, i.e. to determine whether the memory RAM of the converter unit TTU has sufficient capacity for the acceptance of signals. In the simplest case, it is checked in this context as to whether the memory RAM is empty. If the microprocessor MP determines that the memory RAM has a sufficient signal acceptance capability in order to accept at least one further signal group from a teletex station, then it effects the emission of an acknowledgment character to the appertaining teletex station. It is only after acceptance of this acknowledgment character that the appertaining station occasions the emission of signals forming a further signal group to the converter unit TTU. Following this signal group, a signal group end mark again occurs which is evaluated in the converter unit TTU in the same manner as discussed above. In order to be able to simply undertake the transmission of the appertaining signals or, respectively, characters, the appertaining teletex station is through connected to the converter TTU until all signals have been emitted by the appertaining teletex station.

The signals forming signal groups and, respectively, input into the memory RAM of the converter unit TTU are then read from the memory RAM in order to be transmitted to the desired telex station Tx. Thereby, the interface unit USARTa effects the transmission of these signals with the data transmission procedure and in the data format in accordance with which the telex station or, respectively, the telex stations is, or respectively, are designed.

In order to be able to switch on the signaling converter circuit USARTd or the data switching circuit HDLC, depending on the type of digital signals transmitted, either signaling information or message information, appropriate control signals are to be emitted by the microprocessor MP of the control circuit by way of the control bus CB. The microprocessor MP can respectively emit such control signals at specific times during the respective transmission of digital signals to or, respectively, from the memory RAM. This means that the microprocessor transmits appropriate control signals to the converter circuit USARTd during the so-called signaling phase and transmits appertaining, other control signals to the data switching circuit HDLC during the text transmission phase. The control signals intended for the drive of the converter circuit USARTd thereby occur during each signaling phase, i.e. during the time span of the transmission of a signaling information from or, respectively, to the memory RAM. Thereby, the interface circuits can be designed in such a manner that they recognize the occurrence of signaling information and subsequently emit appropriate interrupt signals to the microprocessor MP.

In conclusion, it should also be pointed out with respect to the converter unit TTU that the microprocessor MP contained in the converter unit, together with the program memory ROM, represents the actual control means of the converter unit TTU. In response to corresponding requests, the microprocessor MP receives command information for the execution of the control operations to be respectively undertaken from the appertaining program memory ROM. As explained above, such operations occur under the influence of interrupt signals which are supplied to at least one interrupt input of the microprocessor MP. Commercially available modules can be employed for the circuits of the converter unit TTU. Modules designated 8251A of the Intel Company can be employed for the interface circuits USARTa and for the signaling converter unit USARTd. The data switching circuit HDLC can be formed by a module 8273, also of the Intel Company. The switch circuit MUX can be a traditional multiplexer circuit as is known, for example, to those skilled in the art and designated SN74151. The program memory ROM can be formed by modules 2732 of the Intel Company, and the actual signal memory RAM can be formed by modules designated 2185, also by the Intel Company. A microprocessor designated 8085 of the Intel Company can be employed as the microprocessor MP.

It has been explained above that digital signals can be transmitted between transmitting and/or receiving installations operating with differing data transmission procedures and with differing data format. Thereby, with respect to the data transmission procedures, we have proceeded therefrom that these differ from one another both with respect to the data transmission rates and with respect to the types of signal transmission. It should be pointed out, however, that it is also possible that the appertaining data transmission procedures differ from one another only with respect to the data transmission rates.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a circuit arrangement for transmitting data between data stations including first data stations which operate with a first transmission procedure and a first data format and second data stations which operate with a second transmission procedure and a second data format, in which a switching system operates to interconnect first and second data stations via respective terminating circuits which are divided into first and second groups, respectively, the first group assigned to the first data stations and the second group assigned to the second data stations, and in which a converter is provided for converting data transmission of one of the types of data stations into data transmission usable by the other type of data station, the improvement wherein:

the converter is connected to a specific terminating circuit in each of the first and second groups;

said converter includes first means for receiving and storing data transmitted by a first data station;

said first data stations each include second means for transmitting a signal group end mark; and said converter includes third means for checking the available storage capacity of said first means in response to an end mark and transmitting an acknowledgment signal to a first data station as a go-ahead signal for further data transmission.

2. The improved circuit arrangement of claim 1, wherein:

said means comprises a random access memory including a data input and a data output; and wherein said converter comprises:

first and second interface circuits connecting said memory inputs and outputs to the specific terminating circuits and operable to provide service request signals; and a control circuit connected to said interface circuits and said memory and responsive to a service request signal from an interface circuit connected to one of said specific terminating circuits associated with one group to connect that interface circuit to said memory and then connect said memory to the other interface circuit associated with the other group.

3. The improved circuit arrangement of claim 2, wherein: said control circuit includes an interrupt input; and at least one of said interface circuits including means connected to said interrupt input and providing an interrupt signal thereto to cause said control circuit to connect said memory to that interface circuit.

4. The improved circuit arrangement of claim 3, wherein:

said first interface circuit includes an input side connected to the appertaining specific terminating circuit, an output side connected to said memory, a signal converter for converting data parallel-to-series and series-to-parallel input at said input side and a data switching circuit connected between the appertaining specific terminating circuit and said memory and operable during transmission between said memory and a first data station; and said second interface circuit comprises series-to-parallel and parallel-to-series conversion means.

5. The improved circuit arrangement of claim 4, wherein:

said control circuit comprises an address bus, a control bus and a data bus all connected to said memory and to said interface circuits, a program memory connected to each of said buses and storing an operating program for said converter, and a microprocessor connected to said buses for operating said converter in accordance with the program.

6. The improved circuit arrangement of claim 5, wherein said first interface circuit comprises:

a switch circuit connected to the appertaining specific terminating circuit and said signal converter and said data switching circuit and operable in two positions including a first position for the transmission of messages and a second position for the transmission of signaling information.

* * * * *